United States Patent [19]
Kuberski

[11] Patent Number: 5,779,399
[45] Date of Patent: Jul. 14, 1998

[54] ROTARY CUTTING APPARATUS

[75] Inventor: Lawrence Francis Kuberski, St. Charles, Mo.

[73] Assignee: McDonnell Douglas, St. Louis, Mo.

[21] Appl. No.: 611,177

[22] Filed: Mar. 5, 1996

[51] Int. Cl.[6] .................................................. B23C 5/10
[52] U.S. Cl. ..................... 407/54; 407/63; 408/143; 408/227; 408/230
[58] Field of Search ..................... 407/53, 54, 60–63; 408/229, 230, 227, 143

[56] References Cited

U.S. PATENT DOCUMENTS

| | | | |
|---|---|---|---|
| 3,572,183 | 3/1971 | Mellone | 77/67 |
| 3,767,315 | 10/1973 | Burks | 408/59 |
| 4,230,429 | 10/1980 | Eckle | 408/186 |
| 4,662,803 | 5/1987 | Arnold | 408/224 |
| 4,712,948 | 12/1987 | Kidani | 407/54 |
| 4,722,644 | 2/1988 | Scheuch | 408/230 |
| 4,740,121 | 4/1988 | Arnold | 408/224 |
| 5,217,332 | 6/1993 | Takasaki et al. | 408/145 |
| 5,230,593 | 7/1993 | Imanaga et al. | 408/230 |
| 5,302,059 | 4/1994 | Fabiano | 408/223 |
| 5,452,971 | 9/1995 | Nevills | 408/230 |

FOREIGN PATENT DOCUMENTS

| | | | |
|---|---|---|---|
| 0127322 | 12/1984 | European Pat. Off. | B23B 51/04 |
| 55-42760 | 3/1980 | Japan | 407/63 |

*Primary Examiner*—Steven C. Bishop
*Attorney, Agent, or Firm*—Dale B. Halling

[57] ABSTRACT

An end mill (10) has a cylindrical shank (12) with a longitudinal axis (22). Attached to the cylindrical shank (12) is a center flute (14) having a cutting edge (18) extending beyond the longitudinal axis (22). A non-center flute (16) is also attached to the cylindrical shank (12). The center flute (14) has a first rake angle (32) and the non-center flute (16) has a second rake angle (32) not equal to the first axial rake.

17 Claims, 1 Drawing Sheet

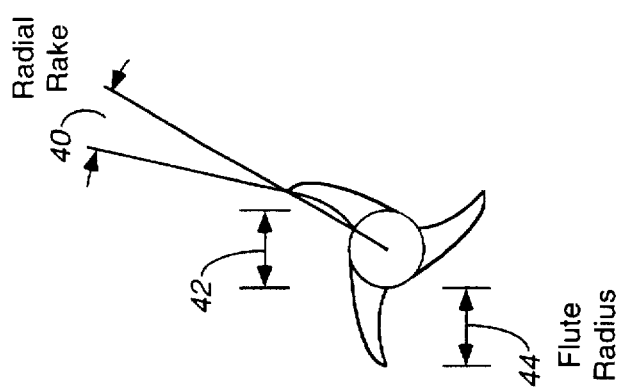
FIG. 3
Horizontal Cross Section of End Mill
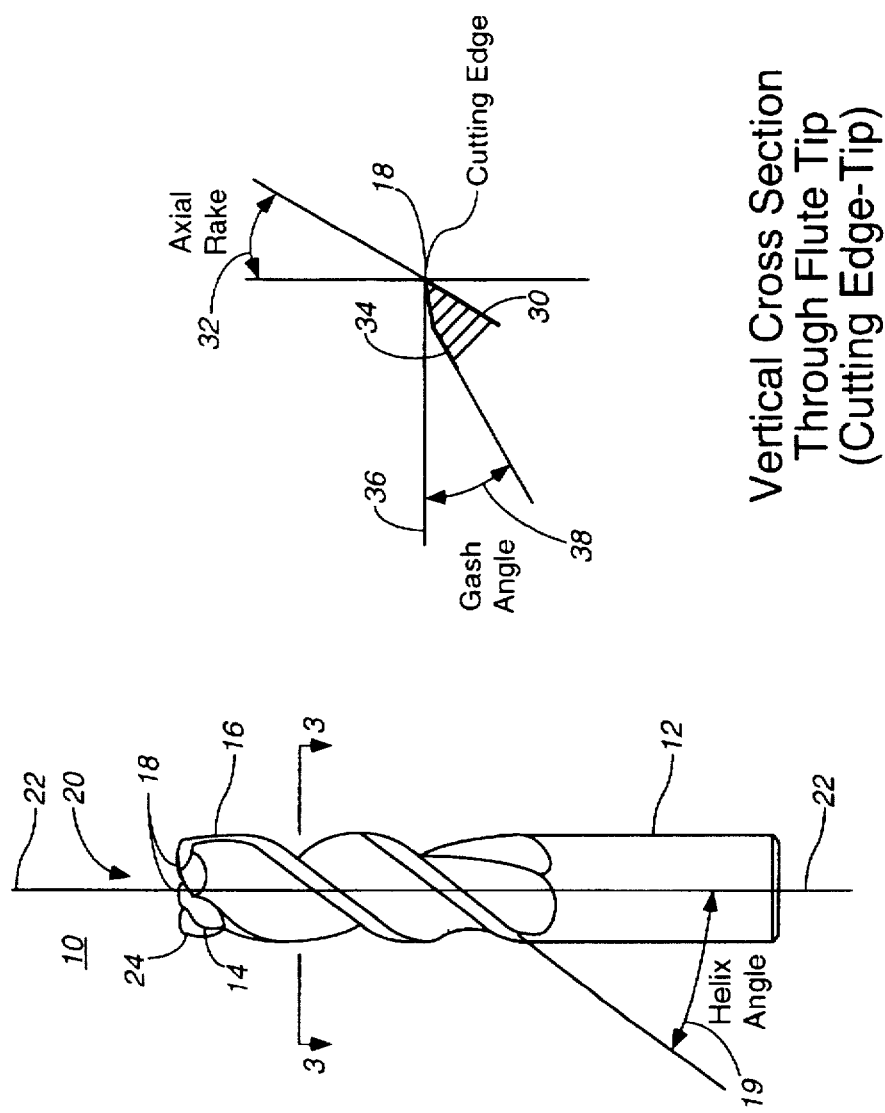
FIG. 2
Vertical Cross Section Through Flute Tip (Cutting Edge-Tip)
FIG. 1

ROTARY CUTTING APPARATUS

FIELD OF THE INVENTION

The invention relates generally to the field of cutting tools and more particularly to a rotary cutting apparatus.

BACKGROUND OF THE INVENTION

High speed machining of hard metals such as titanium alloys is common in the aerospace industry. This high speed machining often involves forming slots using end mills. These end mills usually experience very short lives. Two problems have been identified when using end mills in slotting operations. One problem is the end mill begins to chatter or vibrate, as a result the end mill's cutting edge chips causing premature breakdown of the cutting edge. This chatter problem is even more pronounced when using solid carbide end mills, because of the inherently brittle cutting edge. The second problem is severe chip packing and welding of the chips to one another and the cutting tool. This results from the fact that titanium is a highly reactive, and the rapid oxidation of the freshly machined chips results in a tendency to alloy with the cutting tool and with other chips.

Prior art designs have attempted to resolve the chatter problem by changing the side cutting action (radial geometry) of the end mill. Specifically, they have changed the helix angle, radial rake or staggered the flutes. None of these has been successful in eliminating or significantly reducing the chatter problem.

Thus there exists a need for a rotary cutting device that reduces or eliminates the chatter or vibration and solves the problem of chip packing.

SUMMARY OF THE INVENTION

A rotary cutting apparatus that solves these problems has a cylindrical shank. Attached to the cylindrical shank is a first flute. The first flute has a first characteristic frequency. A second flute is also attached to the cylindrical shank. The second flute has a second characteristic frequency.

BRIEF DESCRIPTION OF THE DRAWINGS

FIG. 1 is a side view of a rotary cutting apparatus;

FIG. 2 is a vertical cross section of a flute of the rotary cutting apparatus of FIG 1; and FIG. 3 is a horizontal cross section taken along the 3—3 line, in FIG. 1, of the rotary cutting device.

DETAILED DESCRIPTION OF THE DRAWINGS

FIG. 1 shows a side view of an end mill (rotary cutting apparatus) 10. A cylindrical shank 12 is used to attach the end mill 10 to a milling machine. Attached to the cylindrical shank 12 is a center flute (first flute) 14. Also attached to the cylindrical shank 12 is a non-center flute (second flute) 16. In one embodiment the end mill 10 has a plurality of second flutes 16. Often end mills 10 are formed of solid carbide. Also shown in FIG. 1 is a helix angle 19 of a flute. In one embodiment, the helix angle 19 of the first flute 14 is equal to the second helix angle 19a of the second flute 16. In another embodiment, the center flute 14 and the plurality of non-center flutes 16 are equally spaced.

Three features distinguish the center flute 14 from the non-center flute 16. One, the cutting edge 18 at the tip 20 of the center flute 14 extends radially outward from the center or longitudinal axis 22 of the shank (end mill). The cutting edge 18 of the non-center flute 16 does not extend radially outward from the longitudinal axis 22. Second, the cutting edge 18 of the center flute 14 extends from an exterior perimeter 24 of the flute beyond the longitudinal axis 22. The non-center flute 16 does not extend beyond longitudinal axis 22. According to the invention the center flute 14 has a first, characteristic frequency and the non-center flute has a second characteristic frequency. The first characteristic frequency is not equal to the second characteristic frequency and in the preferred embodiment the first characteristic frequency is not a harmonic (sub harmonic) of the second characteristic frequency. Characteristic frequency as used herein is the natural frequency that a flute vibrates at when cutting a material. By having different characteristic frequencies for the first flute 14 and the second flute 16 they tend to interfere or dampen each other. As a result, the end mill 10 does not chatter or vibrate thus extending the life of the cutting edge.

FIG. 2 shows a vertical cross section of a flute tip 20. The angle that a front face 30 makes with a vertical line (e.g., longitudinal axis) is the axial rake (axial rake angle) 32. The angle the back face 34 of the flute makes with a horizontal line 36 is the gash angle 38. The axial geometry refers to the axial rake and the gash angle. According to the invention the center flute 14 has a first axial rake that differs from the non-center flute's second axial rake. In one embodiment, the first axial rake is less than the second axial rake. In another embodiment the second axial rake is greater than five degrees. The high second axial rake tends to push metal chips up and out from the flutes, which reduces chip packing. The lower first axial rake provides the necessary cutting edge and flute strength to ramp cut or circular interpolate into hard materials, such as titanium alloys.

FIG. 3 shows a cross section of the end mill 10 taken along the 3—3 line. The figure shows the radial rake 40 as the angle the side cutting edge makes with a radial line. Also shown in the figure is the core diameter 42 of the end mill 10 and the flute radius 44. According to the invention the generous flute radius 44 also serves to lift the metal chips away from the cutting edges of the end mill 10. A flute radius greater than one half the core diameter is considered generous.

The characteristic frequency of the flutes is adjusted by changing the axial geometry of the rotary cutting apparatus 10. The first flute 14 has a first axial geometry and the second flute 16 has a second axial geometry. By changing the axial rake from one flute to the next results in each flute having a different applied force at the tip. This change in applied force changes the flute's characteristic frequency, much like changing the tension on a string changes the characteristic frequency of the string. Since the vibration is dampened out, all the flutes contribute to the cutting action. Thus in a three flute design of the rotary cutting apparatus the cutting rate can be calculated using three flutes instead of just the center flute, which is typical for tools with only one center cutting flute.

Thus there has been described a rotary cutting device that reduces or eliminates chatter and overcomes the problems of chip packing. While the invention has been described in conjunction with specific embodiments thereof, it is evident that many alterations, modifications, and variations will be apparent to those skilled in the art in light of the foregoing description. Accordingly, it is intended to embrace all such alterations, modifications, and variations in the appended claims.

What is claimed is:

1. An end mill apparatus, comprising:

a cylindrical shank having a longitudinal axis;

a center flute formed on the cylindrical shank, the center flute having a first axial rake;

a non-center flute formed on the cylindrical shank, the non-center flute having a second axial rake not equal to the first axial rake; and a tip having an approximately planar surface on which the center flute terminates in a cutting edge, the cutting edge extending radially from an exterior perimeter through and beyond the longitudinal axis.

2. The apparatus of claim 1, wherein the center flute has a helix angle that is equal to a second helix angle of the non-center flute.

3. The apparatus of claim 1, wherein there are a plurality of non-center flutes.

4. The apparatus of claim 3, wherein the center flute and the plurality of non-center flutes are equally spaced.

5. The apparatus of claim 1, wherein the apparatus is made of carbide.

6. The apparatus of claim 1, wherein the center flute has a first characteristic frequency and the non-center flute has a second characteristic frequency not equal to the first characteristic frequency.

7. A rotary cutting apparatus, comprising:

a cylindrical shank;

a first flute formed on the cylindrical shank, having a first characteristic frequency and a cutting edge extending radially from an exterior perimeter through and beyond a longitudinal axis; and a second flute formed on the cylindrical shank, the second flute having a second characteristic frequency not equal to the first characteristic frequency.

8. The apparatus of claim 7, wherein the first characteristic frequency is not a harmonic of the second characteristic frequency.

9. The apparatus of claim 7, wherein the first flute has a helix angle that is equal to a second helix angle of the second flute.

10. The apparatus of claim 9, wherein there are a plurality of second flutes.

11. The apparatus of claim 10, wherein the first flute and the plurality of second flutes are equally spaced.

12. The apparatus of claim 11, wherein the first flute has a first axial rake angle and the plurality of second flutes have a second axial rake angle not equal to the first axial rake angle.

13. The apparatus of claim 12, wherein the second axial rake is greater than five degrees.

14. A rotary cutting apparatus, comprising:

a cylindrical shank;

a first flute formed on the cylindrical shank, having a first axial geometry and a cutting edge extending radially from an exterior perimeter through and beyond a longitudinal axis; and a second flute formed on the cylindrical shank, the second flute having a second axial geometry not equal to the first axial geometry.

15. The apparatus of claim 14, wherein the first flute has a flute radius is greater than one half a core diameter.

16. The apparatus of claim 14, the second flute has an axial rake greater than five degrees.

17. The apparatus of claim 14, wherein the first flute has a first radial geometry and the second flute has the first radial geometry.

* * * * *